United States Patent
Vignotto et al.

[19]

[11] Patent Number: 5,927,820
[45] Date of Patent: Jul. 27, 1999

[54] HUB-WHEEL ASSEMBLY, IN PARTICULAR FOR A VEHICLE

[75] Inventors: Angelo Vignotto, Turin; Domenico Ducci, Marentino; Paolo Bertetti, Turin; Stefano Bertalmio, Pinerolo, all of Italy

[73] Assignee: SKF Industrie S.p.A., Turin, Italy

[21] Appl. No.: 08/886,545

[22] Filed: Jul. 1, 1997

[30] Foreign Application Priority Data

Jul. 2, 1996 [IT] Italy .................................. T096A0566

[51] Int. Cl.⁶ .................................................. B60B 27/00
[52] U.S. Cl. ............................................................ 301/105.1
[58] Field of Search .............................. 301/105.1, 125; 180/258, 259, 73.1, 73.31, 73.32; 388/544

[56] References Cited

U.S. PATENT DOCUMENTS

| | | | |
|---|---|---|---|
| 4,504,099 | 3/1985 | Miki et al. ................................. | 180/259 |
| 4,582,338 | 4/1986 | Colanzi ..................................... | 301/125 |
| 4,798,560 | 1/1989 | Farrell ...................................... | 384/544 |
| 4,858,998 | 8/1989 | Welschof et al. . | |
| 5,492,417 | 2/1996 | Baker et al. .............................. | 384/544 |
| 5,536,075 | 7/1996 | Bertetti . | |

FOREIGN PATENT DOCUMENTS

| | | | |
|---|---|---|---|
| 610782 | 8/1994 | European Pat. Off. . | |
| 2198995 | 6/1988 | United Kingdom ................ | 301/105.1 |
| 2199906 | 7/1988 | United Kingdom ................ | 301/105.1 |

*Primary Examiner*—D. Glenn Dayoan
*Assistant Examiner*—Long Bao Nguyen
*Attorney, Agent, or Firm*—Burns, Doane, Swecker & Mathis, L.L.P.

[57] ABSTRACT

A hub-wheel assembly having a rolling bearing wherein the rolling bodies roll between an inner ring having a flange for connection to the wheel and to the brake disk, and an outer ring having a flange for connection to the suspension upright. The bearing has an applied element in turn having two ears for connection of the brake calipers, and which is connected peripherally to the flange of the outer ring; and the applied element and the flange of the outer ring are made angularly integral with each other by pins engaging respective holes formed partly along the edge of the applied element and partly along the mating edge of the flange of the outer ring.

12 Claims, 2 Drawing Sheets

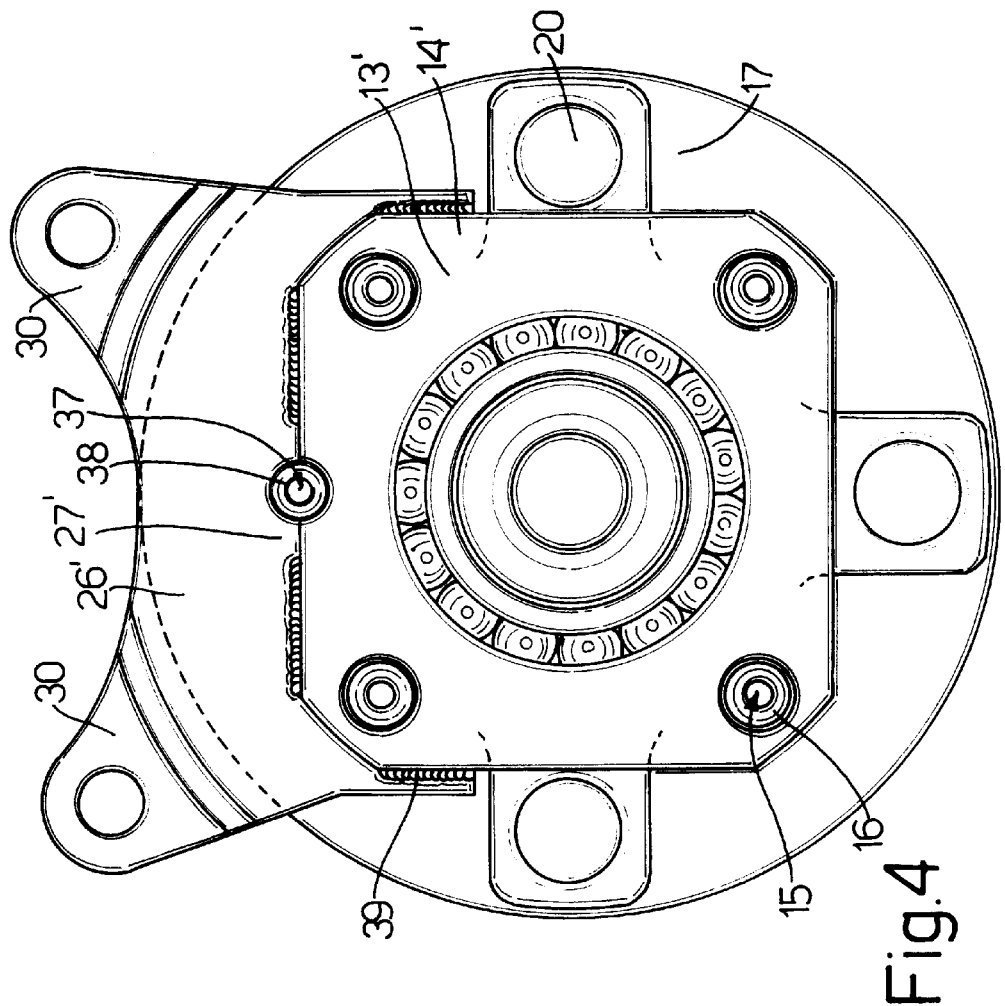
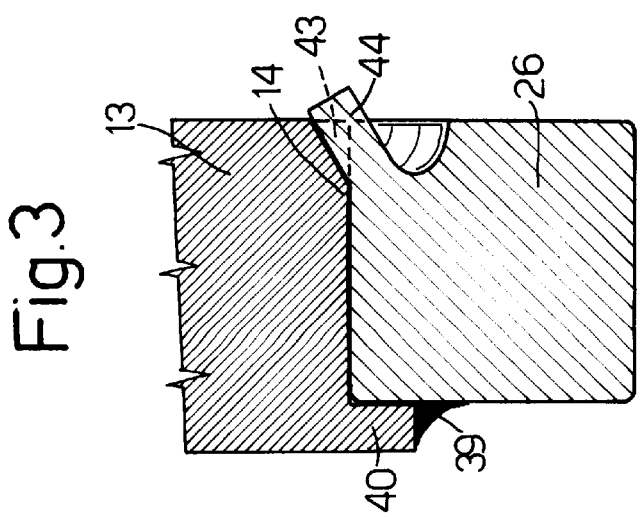

HUB-WHEEL ASSEMBLY, IN PARTICULAR FOR A VEHICLE

BACKGROUND OF THE INVENTION

The present invention relates to a hub-wheel assembly, in particular for a vehicle.

As is known, the suspensions of many recent vehicle models are connected to the wheels by so-called "biflanged" bearings, e.g. comprising an outer ring with an integral flange fitted to the suspension upright, and an inner ring with an integral flange opposite the first and fitted directly to the wheel. Rolling bodies are interposed between the inner and outer ring, and, in the case of drive wheels, the inner ring comprises a splined coupling for receiving power from a pin of a universal constant-velocity joint.

The inner ring therefore also acts as a hub and stub axle, and comprises the brake disk (or drum), thus enabling a certain amount of integration of the assembly parts and so reducing the weight and cost of the assembly. Conversely, the brake caliper connections are normally applied to the upright, as in conventional assemblies.

The hub-wheel assembly described above therefore only provides for a limited amount of integration, and hence for a limited reduction in weight and cost. To overcome which drawback, RIV-SKF U.S. Pat. No. 4,582,338, granted on Apr. 15, 1986, proposes forming the brake caliper assembly ears integral with the outer ring flange. Such a solution, however, on the one hand, transmits braking stress onto the outer ring of the bearing, thus reducing the working life of the bearing, and, on the other, greatly increases the cost and difficulty of forming the flange with the ears, so much so, in fact, that the solution described in the patent has never been produced.

SUMMARY OF THE INVENTION

It is an object of the present invention to provide a hub-wheel assembly designed to overcome the aforementioned drawbacks, and which, in particular, is straightforward and cheap to produce, while at the same time being compact and lightweight.

According to the present invention, there is provided a hub-wheel assembly for a vehicle, comprising a bearing for connecting a wheel in rotary manner to an upright of a suspension of the vehicle; said bearing comprising a first ring having an integral first flange, a second ring having an integral second flange opposite the first flange, and a number of rolling bodies interposed between said rings; and said first and second flanges being fitted respectively to said wheel and said upright; characterized by comprising a plate-like applied element so shaped as to be connectable peripherally to at least part of said second flange; said applied element having, integrally and on an edge opposite that for connection to said second flange, two projecting ears for the connection of respective elements of a braking assembly of said wheel.

BRIEF DESCRIPTION OF THE DRAWINGS

A preferred, non-limiting embodiment of the present invention will be described by way of example with reference to the accompanying drawings, in which:

FIG. 3 shows an enlarged view of a detail in FIG. 2;

FIG. 4 shows a side view of a variation of the FIG. 1 hub-wheel assembly.

DETAILED DESCRIPTION OF THE INVENTION

Figure 2:
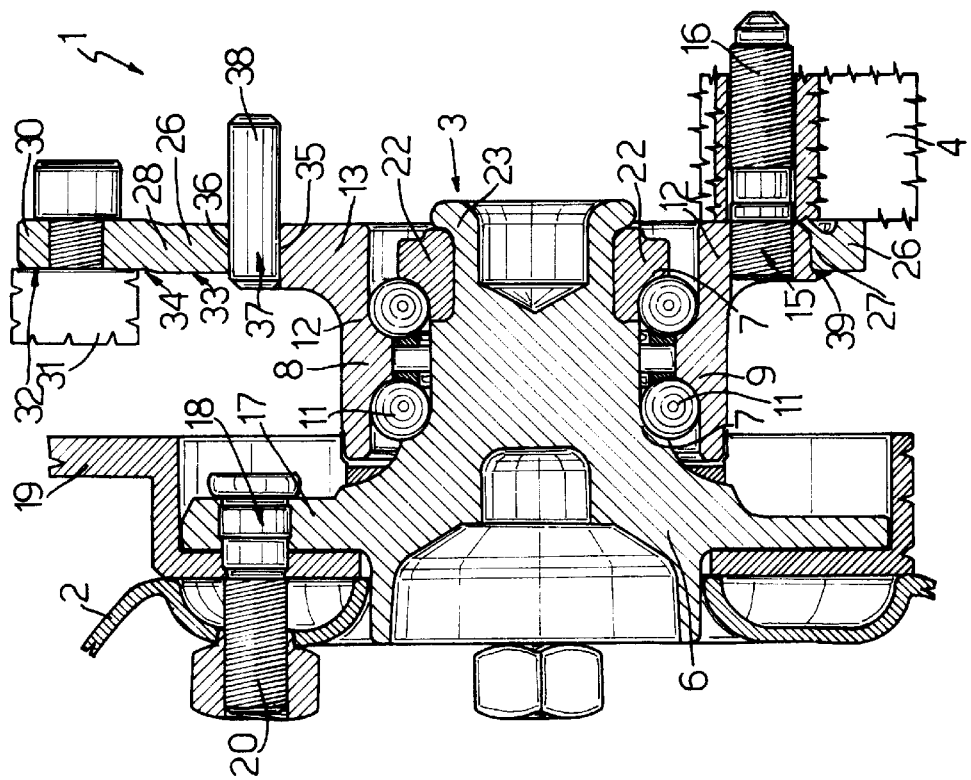
FIG. 2 shows a section along line II—II of the FIG. 1 hub-wheel assembly.
Figure 1:
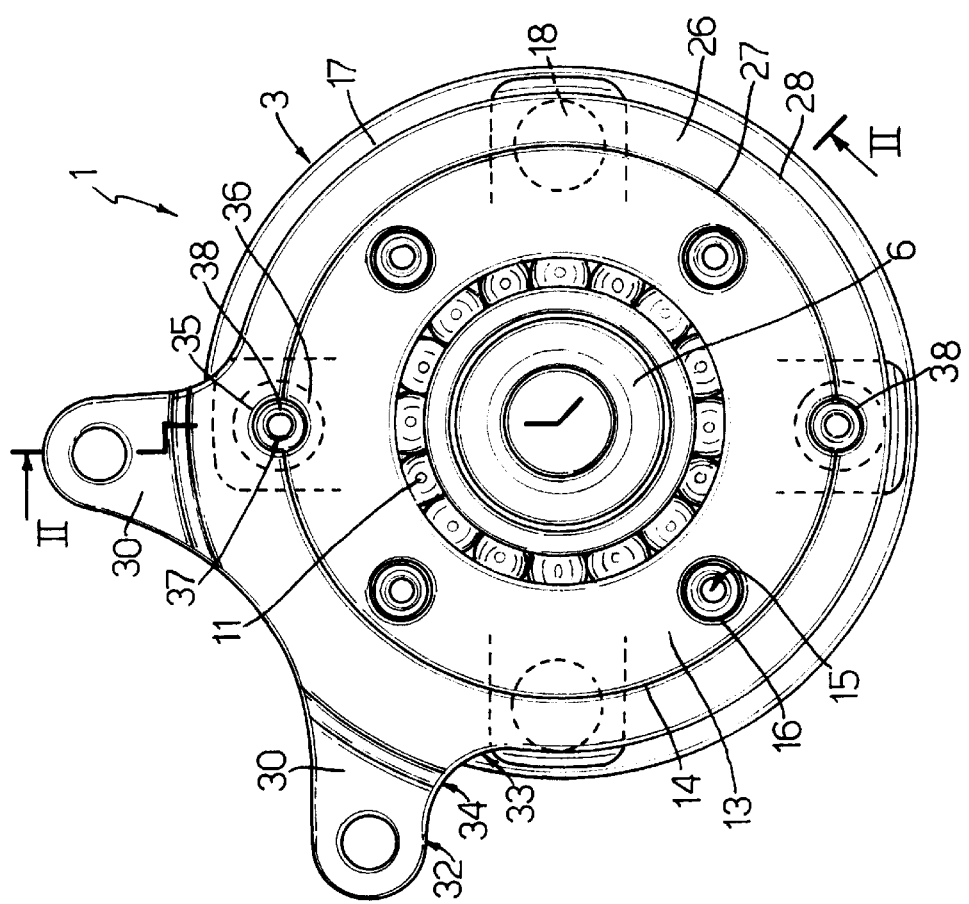
FIG. 1 shows a side view of a hub-wheel assembly in accordance with the teachings of the present invention.

Number 1 in FIGS. 1 and 2 indicates a hub-wheel assembly relative to a driven wheel 2 of a vehicle (not shown), and comprising a bearing 3 for connecting wheel 2 in rotary manner to an upright 4 of a suspension (not shown).

Bearing 3 comprises an inner ring 6 with races 7; an outer ring 8 with races 9 facing respective races 7; and a number of rolling bodies 11 located between rings 6 and 8 and rolling between races 7 and 9.

At one end 12, outer ring 8 comprises a preferably circular connecting flange 13, which is formed integrally in one piece with outer ring 8, has an outer edge 14 and a number of assembly holes 15 formed in a circle in the flange itself, and is fitted to upright 4 of the suspension by stress transferring elements in the form of threaded studs or screws 16 inserted inside assembly holes 15.

On the wheel 2 side, inner ring 6 comprises a connecting flange 17 formed integrally in one piece with inner ring 6 and in turn comprising a number of assembly holes 18 formed in a circle in the flange itself. Flange 17, and consequently inner ring 6 forming one piece with it, acts as a hub for wheel 2, which, together with a braking body 19 (a disk or drum in the example shown), is fitted angularly integral with flange 17 by means of screws 20 inserted inside assembly holes 18. Inner ring 6 is preferably in two parts, and comprises an annular half element 22 in turn comprising one of the two races 7 and housed inside a seat 23 formed on inner ring 6, on the opposite side to wheel 2.

Bearing 3 also comprises a substantially annular, plate-like applied element 26 having an inner edge 27, which mates with the outer edge 14 of flange 13.

On the edge 28 opposite the edge mating with flange 13, applied element 26 is formed in one piece with two projecting ears 30 for the connection of respective brake calipers 31 and having respective lateral mating surfaces 32 for the calipers; and applied element 26 comprises a lateral surface 33 facing the same way as lateral surfaces 32 of ears 30, and connected to lateral surfaces 32 by two oblique connecting surfaces 34.

Two diametrically-opposed first transverse grooves 35 are formed on outer edge 14 of flange 13; two diametrically-opposed second transverse grooves 36 are formed on inner edge 27 of applied element 26, and mate with first grooves 35 to define two respective holes 37; and two stress transferring elements in the form of pins 38, inserted inside holes 37, partly inside first grooves 35 and partly inside second grooves 36, connect flange 13 and applied element 26 integrally to each other and integrally to upright 4 of the suspension (in a manner not shown).

To prevent applied element 26 from moving axially with respect to flange 13, outer edge 14 of flange 13 comprises, in portions or continuously, a stop element 40 for arresting applied element 26; a laser weld 39 (in the form of weld spots or a bead) is formed at stop element 40 to connect inner edge 27 of applied element 26 to outer edge 14 of flange 13; and, on the opposite side to the weld, applied element 26 is locked by one or more turned-up portions 44.

To ensure a more reliable connection of flange 13 and applied element 26, while at the same time reducing the weld to a few spots, the solution shown in the enlarged view in FIG. 3 may be adopted, wherein, as opposed to a continuous edge, flange 13 comprises a number of notches 43, and turned-up portions 44 comprise a number of appendixes engaging notches 43.

In the FIG. 4 variation, the connecting flange—here indicated 13'—of outer ring 8 of bearing 3 is substantially square with rounded corners, at which respective assembly holes 15 are formed. Consequently, the applied element—here indicated 26'—also differs in shape, comprises a substantially C-shaped inner edge, and mates with only part of flange 13'.

Besides being connected peripherally, flange 13' and applied element 26' are also connected angularly integral with each other by one of pins 38, the hole 37 of which is formed centrally with respect to ears 30 and between the inner edge 27' of applied element 26' and the outer edge 14' of flange 13'. As before, pin 38 also provides for connection to upright 4 of the suspension.

In this case, too, inner edge 27' is welded to outer edge 14'.

The advantages of the hub-wheel assembly according to the present invention will be clear from the foregoing description. On the one hand, it provides for a higher degree of integration as compared with the conventional solution, in which the brake calipers are fitted to the suspension upright; and, on the other, it provides for eliminating the aforementioned drawbacks of the solution proposed in U.S. Pat. No. 4,582,338.

As compared with the latter solution, the applied element and the way in which it is connected to the outer ring flange and to the suspension upright provide for transferring braking stress between the flange and the upright, thus reducing wear and increasing the working life of the bearing.

Producing two separate parts, one comprising the outer ring and respective flange, and the other comprising the applied element with the brake caliper ears, provides for faster, cheaper production as compared with a single piece comprising both parts.

A further advantage of the above solution lies in the possibility of fitting different vehicles with bearings comprising different applied elements adaptable to the position of the brake calipers on the vehicle. More specifically, the advantage lies in the possibility of producing the applied elements separately from the bearings, which are produced in standard types, and connecting them to the bearings at the assembly stage, thus enabling a considerable reduction in cost.

Clearly, changes may be made to the hub-wheel assembly as described and illustrated herein without, however, departing from the scope of the present invention.

We claim:

1. A hub-wheel assembly for a vehicle, comprising a bearing adapted to connect a wheel in rotary manner to an upright of a suspension of the vehicle; said bearing comprising a first ring having an integral first radial flange, a second ring arranged coaxially with said first ring and having an integral second radial flange situated axially opposite the first flange, a number of rolling bodies radially interposed between said first and second rings to provide for relative rotation therebetween; said first and second flanges adapted to be secured respectively to said wheel and said upright; a separate generally plate-shaped applied element including a radially facing first edge seated on an oppositely radially facing second edge of said second flange; a torque transferring element operably connected to said second flange and said applied element for transferring angular torsion from said applied element to said second flange; said applied element having a radially facing third edge facing away from said first edge; and two ears projecting integrally from said third edge and adapted for connection to respective elements of a braking assembly for said wheel.

2. The hub-wheel assembly according to claim 1 wherein said torque transferring element is radially interposed between said first and second edges.

3. The hub-wheel assembly according to claim 2 wherein said first edge faces radially inwardly and includes a first axial groove; said second edge facing radially outwardly and including a second axial groove disposed in radially facing relationship to said first groove to form a hole together therewith; said torque transferring element comprising a pin inserted in said hole to lie partially in said first groove and partially in said second groove.

4. The hub-wheel assembly as recited in claim 3 further comprising at least one stress transferring element connected to said second flange and adapted to be connected to the upright.

5. The hub-wheel assembly as recited in claim 4 wherein said at least one stress transferring element comprises a threaded stud engaged in a hole formed in said second flange, said stud extending parallel to a common axis of said first and second rings and projecting from said second ring in a direction away from said first flange.

6. The hub-wheel assembly 4 wherein said at least one stress transferring element comprises a pin mounted in a hole formed in said second flange and extending parallel to a common axis of said first and second rings, said pin projecting from said second flange in a direction away from said first flange.

7. The hub-wheel assembly according to claim 1 wherein said applied element is welded to said second flange.

8. The hub-wheel assembly according to claim 1 wherein said second edge includes an annular stop element extending radially along an axially facing surface of said applied element for axially arresting said applied element.

9. The hub-wheel assembly according to claim 1 wherein each of said ears comprises a flat first lateral surface adapted to mate with a brake caliper, and said applied element further comprising a flat second lateral surface facing the same way as said first lateral surface, and an oblique surface interconnecting said first lateral surface and said second lateral surface.

10. The hub-wheel assembly according to claim 1, wherein said second flange is substantially annular.

11. The hub-wheel assembly according to claim 1, wherein said second flange is substantially square.

12. The hub-wheel assembly according to claim 1, wherein said second flange comprises a number of notches arranged in a circle along said second edge; and said applied element comprises a number of appendixes extending from said first edge and engaging said notches to integrally connect said second flange to said applied element.

* * * * *